US008517427B2

(12) United States Patent
Herlin et al.

(10) Patent No.: US 8,517,427 B2
(45) Date of Patent: Aug. 27, 2013

(54) INFORMATION PAGE AND A METHOD

(75) Inventors: Jari Herlin, Helsinki (FI); Mika Holmberg, Helsinki (FI); Maila Korhonen, Vantaa (FI); Taru Syrjänen, Vantaa (FI); Ari Vairola, Helsinki (FI)

(73) Assignee: Setec Oy, Vantaa (FI)

( * ) Notice: Subject to any disclaimer, the term of this patent is extended or adjusted under 35 U.S.C. 154(b) by 771 days.

(21) Appl. No.: 12/092,177

(22) PCT Filed: Oct. 30, 2006

(86) PCT No.: PCT/FI2006/050468

§ 371 (c)(1),
(2), (4) Date: Sep. 9, 2008

(87) PCT Pub. No.: WO2007/051906

PCT Pub. Date: May 10, 2007

(65) Prior Publication Data

US 2009/0212553 A1 Aug. 27, 2009

(30) Foreign Application Priority Data

Oct. 31, 2005 (EP) .................................... 05110169

(51) Int. Cl.

| | |
|---|---|
| ***B42D 1/00*** | (2006.01) |
| ***B42D 19/00*** | (2006.01) |
| ***B42D 5/00*** | (2006.01) |
| ***B42D 15/00*** | (2006.01) |
| ***G09C 3/00*** | (2006.01) |

(52) U.S. Cl.

USPC ...... 283/98; 281/2; 281/3.1; 281/5; 281/15.1; 281/23; 283/61; 283/62; 283/72; 283/74; 283/75; 283/77; 283/79; 283/83; 283/86; 283/105; 283/112; 283/901

(58) Field of Classification Search

USPC ............... 281/2, 3.1, 5, 15.1, 23, 51; 283/61, 283/62, 72, 74, 75, 77, 79, 83, 86, 98, 105, 283/112, 901

See application file for complete search history.

(56) References Cited

U.S. PATENT DOCUMENTS

| | | | | |
|---|---|---|---|---|
| 4,174,857 | A | 11/1979 | Koza | |
| 4,234,214 | A | 11/1980 | Lee et al. | |
| 6,135,503 | A * | 10/2000 | Lob et al. | 283/74 |
| 6,213,702 | B1 * | 4/2001 | Wesselink | 281/23 |
| 2007/0246931 | A1 * | 10/2007 | Hansen et al. | 283/83 |

FOREIGN PATENT DOCUMENTS

| | | |
|---|---|---|
| DE | 82 36 980 U1 | 6/1985 |
| EP | 1 245 407 B1 | 4/2006 |
| GB | 1 108 345 | 4/1968 |

(Continued)

OTHER PUBLICATIONS

Office Action issued May 26, 2011 in Japanese Application No. 2008-538375.

*Primary Examiner* — Dana Ross
*Assistant Examiner* — Justin V Lewis
(74) *Attorney, Agent, or Firm* — Panitch Schwarze Belisario & Nadel LLP

(57) ABSTRACT

An information page (1) and method are provided for a security document. The information page includes: an information part (3), and an attachment part (2) for attaching the information part to the security document. In order to make forgery visually detectable, the information part (3) is provided with a unique identifier (5), and the attachment part (2, 2') is provided with the same unique identifier (5) as the information part (3).

8 Claims, 2 Drawing Sheets

(56) References Cited

FOREIGN PATENT DOCUMENTS

| | | | |
|---|---|---|---|
| GB | 2 372 232 | A | 8/2002 |
| JP | 11157255 | A | 6/1999 |
| WO | 2004/110780 | A1 | 12/2004 |
| WO | 2005/066886 | A1 | 7/2005 |

* cited by examiner

INFORMATION PAGE AND A METHOD

CROSS-REFERENCE TO RELATED APPLICATION

This application is a Section 371 of International Application No. PCT/FI2006/050468, filed Oct. 30, 2006, which was published in the English language on May 10, 2007, under International Publication No. WO 2007/051906 A1, and the disclosure of which is incorporated herein by reference.

BACKGROUND OF THE INVENTION

1. Field of the Invention

This invention relates to an information page for a security document, such as for a passport, and especially to a solution which improves the security of the information page against forgery.

2. Description of Prior Art

Properties to be required of an information page of a security document are partly contradictory. First, the structure of the information part of the information page, whereto at least a part of the information of the information page is entered, should make it impossible for a forger to disassemble the information part. A further requirement is that at least some of the information to be provided on the information page can be entered thereto by utilizing laser engraving. In order to achieve these goals, in practice the information part has to be manufactured from a material whose bending properties and bending durability are poor.

However, an information page should have good bending properties as well as good bending durability in order to make it possible to attach the information page to a security document in a similar way as the other pages of the security document. Consequently, it is necessary to fasten a flexible and bending-durable attachment part to the information part so as to enable the information page to be attached to the security document. In order to achieve a sufficient security level it should not be possible for a forger to detach the information part from the attachment part.

The most significant drawback of the aforementioned known solution is that a forger may find out a way of detaching the information part from the attachment part and, after this, attaching another information part to the attachment part of the security document without leaving visible marks on the information page. In such a case it will not be possible to detect that the information part of the information page in the security document has been changed.

SUMMARY OF THE INVENTION

An object of the present invention is to provide a solution which makes it possible to ensure that a forgery, where an original information part of an information page has been replaced by another information part, can be detected. This object is achieved by an information page in accordance with the following description and attached drawings as well as by a method in accordance with the following description and attached drawings.

The invention is based on the idea of providing the information part and the attachment part with a unique identifier which is specific for the information page in question. Such a unique identifier can consist of text, numbers, a symbol, an image or a photo, for instance. The information part and the attachment part will thereby become a pair from which the same unique identifier can be visually detected. A forgery attempt can therefore be easily detected, as the same unique identifier can no longer be found on the information part and the attachment part.

The identifier can be provided on the information part and the attachment part by using the same technique or alternatively different techniques. One alternative is to provide the information part with a serial number by laser engraving or printing, for instance, while the same serial number is provided on the information part with an other technique, such as by perforating.

In a preferred embodiment of the present invention the information part and the attachment part are arranged to overlap each other at least partly in an overlapping area, and the unique identifier is arranged in the overlapping area as a perforation protruding completely through at least one of the information part and the attachment part, and at least partly through the other one of said information part and said attachment part. Such a perforation is very easy to obtain by utilizing a laser beam, for instance, and the additional steps during manufacturing of the information page can therefore be minimized. A forgery attempt is easy to detect visually, as the perforations do no longer match each other.

The preferred embodiments of the information page and the method according to the invention are disclosed in the following description and attached drawings.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
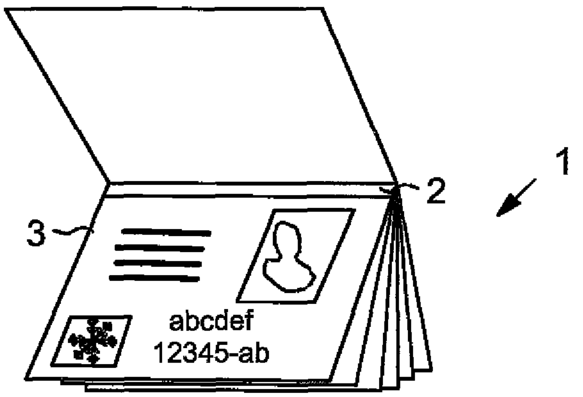
FIG. 1 illustrates a security document with an information page according to the present invention.

FIG. 1 illustrates a security document with an information page 1 according to the present invention. In the example of FIG. 1, the security document is a passport to which the information page 1 has been fastened by means of its attachment part 2. The attachment part 2 of the information page 1 can be fastened to the security document e.g. by means of a stitch, i.e. in the same manner as other pages included in the security document.

An information part 3 of the information page 1 shows identification information provided on the information page, such as the name, date of birth and photograph of the passport owner. Some of the information may have been entered utilizing e.g. laser engraving technology, while some of the information may have been entered utilizing a printing ink.

Figure 2:
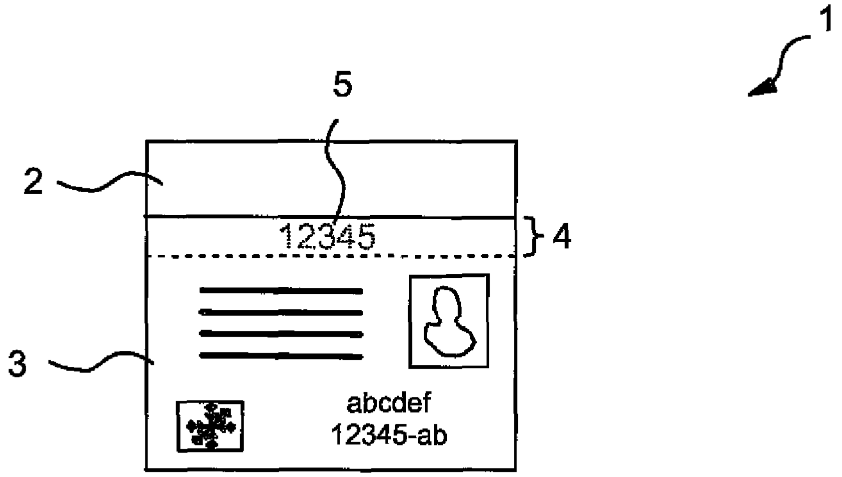
FIGS. 2 and 3 illustrate a first embodiment of the present invention.
Figure 3:
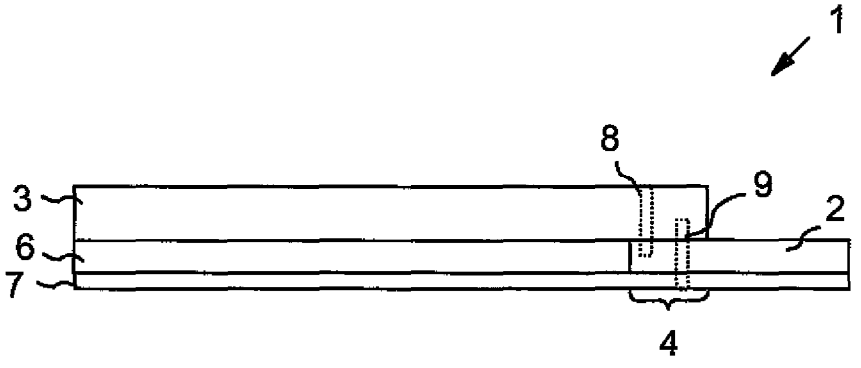

FIGS. 2 and 3 illustrate a first embodiment of the present invention. In the embodiment of FIGS. 2 and 3 the attachment part 2 and the information part are arranged to overlap each other partly. The overlapping area 4 is used for providing the information part 3 and the attachment part 2 with a unique identifier 5. In this embodiment the identifier 5 consists of a perforation reading "12345". The holes of the perforation protrude completely through the material of the information part 3 and continue partly into the material of the attachment part 2. Such a perforation can be accomplished by means of a laser, for instance.

If a forger detaches the information part 3 from the attachment part 2 and later on attaches an other information part 3 to the attachment part 2, then such a forgery will be visually detectable, as the perforations of the identifier 5 do not match. In order to make it even more easy to detect such forgery, the material of the part which is completely perforated (information part or attachment part) is preferably transparent, at least in the area where the identifier is located.

The method of producing the information page 1 is apparent from FIG. 3. The information part 3 preferably consists at least partly of a material suitable for laser engraving. A suitable material is clear carbonized polycarbonate (PC), for instance. In such a case, energy originating from a laser beam causes the plastic material to darken at points at which energy has been directed. Consequently, desired identification information can be written and drawn by laser engraving. The information part 3 can, however, consist of several layers of different material. One possibility is to include a layer of a non-transparent (such as white) polycarbonate.

Also the attachment part 2 can consist of several layers of different material. One alternative is to use polyester or a combination of Teslin and polyester. In that case the unique identifier can be perforated in the attachment part by a laser or alternatively indicated by printing. If the intention is to utilize laser engraving for providing the attachment part 2 with the identifier, then a combination of a clear carbonized polycarbonate and Teslin or alternatively a combination of Teslin and polyester can be used. One alternative is also to coat a layer of Teslin with a printing ink and to utilize a laser to mark the identifier in the printing ink by removing ink with the laser beam in order to produce the identifier.

In order to keep the thickness of the information page 1 fixed, a compensation layer 6 of the same material as the information part 3 or the attachment part 2, for instance, is arranged as an extension of the attachment part 2, as shown in FIG. 3. The information page 1 further comprises a surface layer 7, which may consist of a clear polyester film (PET), for instance.

When the layers shown in FIG. 3 have been arranged on top of each other, they can be attached in the position shown, preferably by lamination, in which case the raised temperature causes the layers to attach to each other, and a uniform information page is achieved. After this the information of the information page can be marked on the information page by printing and/or laser engraving. At this stage it is also possible to utilize a laser in order to perforate the unique identifier 5 in the overlapping area 4, as shown in FIG. 2. FIG. 3 shows two alternative ways for such perforation. The first alternative is to perforate holes 8 which protrude completely through the information part 3 and at least partly through the attachment part 2. The other alternative is to perforate holes 9 which protrude completely through the attachment part 2 and at least partly through the information part 3.

Figure 4:
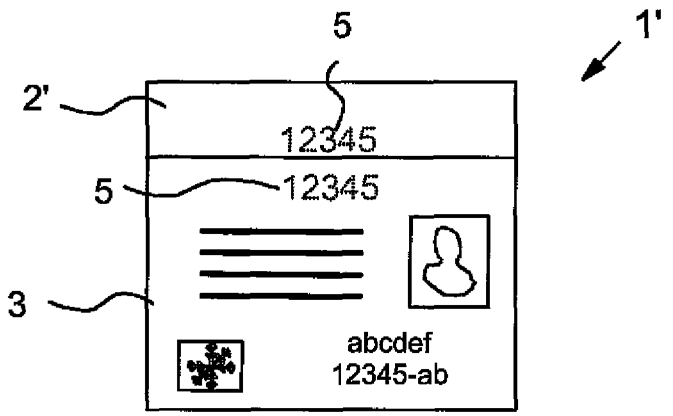
FIGS. 4 to 5 illustrate a second embodiment of the present invention.
Figure 5:
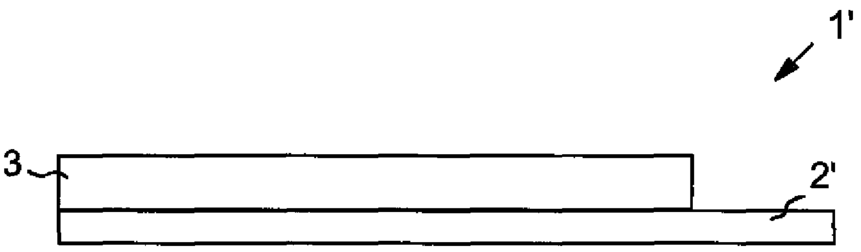

FIGS. 4 to 5 illustrate a second embodiment of the present invention. This embodiment is very similar to the one explained in connection with FIGS. 2 to 3. Therefore the embodiment of FIGS. 4 and 5 will be explained mainly by referring to the differences between these two embodiments. The parts which correspond to the parts in the embodiment of FIGS. 2 to 3 have been marked with the same reference numbers in FIGS. 4 and 5.

The attachment layer 2' has been arranged to cover the entire back surface of the information part 3 in FIGS. 4 and 5. The unique identifier 5 has been arranged in different places on the attachment part 2' and the information part 3. In this embodiment it is assumed, by way of example, that the unique identifier has been arranged on the attachment part 2' and information part 3 by printing or laser engraving. Suitable printing techniques include laser printing, inkjet printing, matrix printing and sublimation printing, for instance.

It is to be understood that the above description and the accompanying figures are only intended to illustrate the present invention. It will be obvious to those skilled in the art that the invention can be varied and modified also in other ways without departing from the scope of the invention.

The invention claimed is:

1. An information page for a security document, the information page comprising:

an information part, and an attachment part for attaching the information part to the security document, wherein:

the information part and the attachment part are arranged in an overlapping position such that the information part and the attachment part overlap each other at least partly in an overlapping area and the information part and the attachment part are directly attached to each other in the overlapping position, and a unique identifier from which forgery can be visually detected is arranged in the overlapping area as a perforation protruding completely through at least one of the information part and the attachment part, and protruding at least partly through the other one of the information part and the attachment part.

2. The information page as claimed in claim 1, wherein the unique identifier includes at least one of the following: text, numbers, a symbol, an image, and a photo.

3. The information page as claimed in claim 1, wherein the unique identifier is provided on the information part and on the attachment part by laser engraving.

4. A method of producing an information page for a security document, comprising:

producing an information part with an attachment part for attaching the information part to a security document by arranging the information part and the attachment part in an overlapping position where the information part and the attachment part overlap each other in an overlapping area, directly attaching the information part and the attachment part to each other in the overlapping position, and providing the information part and the attachment part with a single unique identifier from which forgery can be visually detected in the overlapping area by perforating holes completely through at least one of the information part and the attachment part, and at least partly through the other one of the information part and the attachment part.

5. The method according to claim 4, wherein the unique identifier is provided on the information part and the attachment part by laser engraving.

6. An information page for a security document, the information page comprising:

an information part defining a first plane, the information part showing identification information, the information part having a front surface and an opposing back surface;

an attachment part defining a second plane extending generally parallel to the first plane, the attachment part having a top surface and an opposing bottom surface, the back surface of the information part being fixedly attached to the top surface of the attachment part; and a unique identifier comprising a perforation extending completely through one of the information part and the attachment part and extending only partly through the other of the information part and the attachment part, wherein detachment of the information part from the attachment part is visually detectable due to misalignment of the perforation in the information part and the attachment part.

7. The information page according to claim 6, wherein the attachment part covers the entire back surface of the information part.

8. The information page according to claim 7, wherein a surface layer is attached to the bottom surface of the attachment part.

* * * * *